United States Patent
Ji et al.

(10) Patent No.: US 12,192,877 B2
(45) Date of Patent: Jan. 7, 2025

(54) PROACTIVE SWITCHING OF V2X COMMUNICATION FROM SIDELINK CONNECTION TO CELLULAR CONNECTION

(71) Applicant: Nokia Technologies Oy, Espoo (FI)

(72) Inventors: Lianghai Ji, Aalborg (DK); Jakob Lindbjerg Buthler, Aalborg (DK); Vinh Van Phan, Oulu (FI); Ling Yu, Kauniainen (FI); Hajo Bakker, Eberdingen (DE); Rudraksh Shrivastava, Erligheim (DE); Bernhard Wegmann, Holzkirchen (DE); Xiang Xu, Nanjing (CN)

(73) Assignee: Nokia Technologies Oy, Espoo, FL (US)

( * ) Notice: Subject to any disclaimer, the term of this patent is extended or adjusted under 35 U.S.C. 154(b) by 264 days.

(21) Appl. No.: 17/624,546

(22) PCT Filed: Jul. 4, 2019

(86) PCT No.: PCT/CN2019/094718
§ 371 (c)(1),
(2) Date: Jan. 3, 2022

(87) PCT Pub. No.: WO2021/000322
PCT Pub. Date: Jan. 7, 2021

(65) Prior Publication Data
US 2022/0248301 A1    Aug. 4, 2022

(51) Int. Cl.
*H04W 40/30*    (2009.01)
*H04L 5/00*    (2006.01)
(Continued)

(52) U.S. Cl.
CPC .......... *H04W 40/30* (2013.01); *H04L 5/0053* (2013.01); *H04W 40/248* (2013.01); *H04W 76/20* (2018.02)

(58) Field of Classification Search
CPC ... H04W 40/30; H04W 76/20; H04W 40/248; H04L 5/0053
(Continued)

(56) References Cited

U.S. PATENT DOCUMENTS 8,238,905 B2 *    8/2012    Jiang ..................... H04W 24/06
                                                                455/432.1
9,369,200 B1 *    6/2016    Schmidtke ........... H04B 10/038
(Continued)

FOREIGN PATENT DOCUMENTS

WO    WO 2013/013412 A1    1/2013
WO    WO 2013/170482 A1    11/2013
(Continued)

OTHER PUBLICATIONS

Extended European Search Report for European Application No. 19936299.7 dated Dec. 14, 2022, 11 pages.
(Continued)

*Primary Examiner* — Melvin H Pollack
(74) *Attorney, Agent, or Firm* — Barta Jones, PLLC

(57) ABSTRACT

Embodiments of the present disclosure relate to devices, methods, apparatuses and computer readable storage media of a proactive switch of vehicle-to-everything communication from a device-to-device connection to a connection routed by one or more network devices. In example embodiments, a first terminal device receives, from a second terminal device via a device-to-device connection, an indication of a decision to switch the device-to-device connection to a connection routed by at least one network device for communication with the second terminal device. Based on (Continued)

the received indication from the second terminal device, the first terminal device then determines proactive switching from the device-to-device connection to the routed connection to be performed. The first terminal device then sends a request to a first network device of the at least one network device to set up the routed connection, the request indicating a cause for the determined proactive switching.

20 Claims, 5 Drawing Sheets

(51) Int. Cl.
*H04W 40/24* (2009.01)
*H04W 76/20* (2018.01)
(58) Field of Classification Search
USPC ............................................ 370/329
See application file for complete search history.

(56) References Cited

U.S. PATENT DOCUMENTS

| | | | |
|---|---|---|---|
| 9,854,527 B2 * | 12/2017 | Su | H04W 72/02 |
| 10,110,495 B1 | 10/2018 | Sabella et al. | |
| 10,630,410 B2 * | 4/2020 | Parkvall | H04J 11/0079 |
| 10,708,144 B2 * | 7/2020 | Mohan | H04L 41/5009 |
| 10,856,320 B2 * | 12/2020 | Jung | H04L 5/0091 |
| 10,856,345 B2 * | 12/2020 | Gulati | H04W 72/0446 |
| 10,912,108 B2 * | 2/2021 | Lee | H04W 72/23 |
| 10,952,177 B2 * | 3/2021 | Chandramouli | H04W 48/02 |
| 10,972,913 B2 * | 4/2021 | Kim | H04W 76/11 |
| 10,979,904 B2 * | 4/2021 | Kim | H04W 12/03 |
| 10,992,589 B2 * | 4/2021 | Cheng | H04L 43/16 |
| 11,026,128 B2 * | 6/2021 | Faccin | H04W 8/02 |
| 11,212,765 B2 * | 12/2021 | Enbuske | H04L 1/1864 |
| 11,251,893 B2 * | 2/2022 | Abedini | H04L 1/0009 |
| 11,265,872 B2 * | 3/2022 | Chae | H04L 43/16 |
| 11,287,533 B2 * | 3/2022 | Jin | H04W 48/00 |
| 11,290,923 B2 * | 3/2022 | Akdeniz | H04W 76/11 |
| 11,375,510 B2 * | 6/2022 | Belleschi | H04W 72/52 |
| 11,432,369 B2 * | 8/2022 | Xiong | H04L 5/0091 |
| 11,457,388 B2 * | 9/2022 | Peng | H04W 36/0061 |
| 11,457,429 B2 * | 9/2022 | Lee | H04W 72/0446 |
| 11,477,681 B2 * | 10/2022 | Kim | H04W 76/27 |
| 11,477,836 B2 * | 10/2022 | Hong | H04W 40/34 |
| 11,546,815 B2 * | 1/2023 | Pelletier | H04W 76/25 |
| 11,553,459 B2 * | 1/2023 | Jin | H04W 72/0446 |
| 11,569,964 B2 * | 1/2023 | Baldemair | H04L 1/1861 |
| 11,589,257 B2 * | 2/2023 | Lee | H04W 72/02 |
| 11,617,099 B2 * | 3/2023 | Chae | H04W 72/54 370/329 |
| 11,617,144 B2 * | 3/2023 | Baldemair | H04J 11/0056 370/336 |
| 11,622,416 B2 * | 4/2023 | Zhang | H04W 8/005 370/315 |
| 11,665,673 B2 * | 5/2023 | Wang | H04W 72/0446 370/329 |
| 11,700,508 B2 * | 7/2023 | Li | H04W 4/08 370/312 |
| 11,737,138 B2 * | 8/2023 | Palat | H04W 74/006 370/329 |
| 11,818,757 B2 * | 11/2023 | Balasubramanian | H04L 1/1864 |
| 11,870,594 B2 * | 1/2024 | Wang | H04W 8/30 |
| 11,871,362 B2 * | 1/2024 | Liu | H04W 52/365 |
| 2014/0160950 A1 | 6/2014 | Vasudevan et al. | |
| 2017/0215119 A1 | 7/2017 | Hong et al. | |
| 2020/0128471 A1 * | 4/2020 | Liu | H04W 40/248 |
| 2021/0377810 A1 * | 12/2021 | Condoluci | H04W 28/12 |
| 2022/0248301 A1 * | 8/2022 | Ji | H04W 40/248 |
| 2022/0352959 A1 * | 11/2022 | Uchino | H04W 76/15 |
| 2023/0086337 A1 * | 3/2023 | Sharma | H04W 40/248 370/329 |

FOREIGN PATENT DOCUMENTS

| | | | | |
|---|---|---|---|---|
| WO | 2017/004720 A1 | | 1/2017 | |
| WO | WO-2021028616 A1 | * | 2/2021 | ........... H04L 67/322 |
| WO | WO-2022207096 A1 | * | 10/2022 | |
| WO | WO-2023200558 A1 | * | 10/2023 | ............. H04L 45/22 |

OTHER PUBLICATIONS

"3rd Generation Partnership Project; Technical Specification Group Radio Access Network; NR; Study on NR Vehicle-to-Everything (V2X) (Release 16)", 3GPP TR 38.885, V16.0.0, Mar. 2019, pp. 1-122.

"3rd Generation Partnership Project; Technical Specification Group Services and System Aspects; System Architecture for the 5G System; Stage 2 (Release 16)", 3GPP TS 23.501 V16.0.2, Apr. 2019, pp. 1-317.

"3rd Generation Partnership Project; Technical Specification Group Services and System Aspects; Procedures for the 5G System; Stage 2 (Release 16)", 3GPP TS 23.502, V16.0.2, Apr. 2019, pp. 1-419.

International Search Report and Written Opinion received for corresponding Patent Cooperation Treaty Application No. PCT/CN2019/094718, dated Apr. 2, 2020, 8 pages.

Office Action received for corresponding Chinese Patent Application No. 201980098147.X. dated Aug. 9, 2024, 8 pages of Office Action and no page translation available.

\* cited by examiner

PROACTIVE SWITCHING OF V2X COMMUNICATION FROM SIDELINK CONNECTION TO CELLULAR CONNECTION

RELATED APPLICATION

This application was originally filed as PCT Application No. PCT/CN2019/094718, filed on Jul. 4, 2019, of which is incorporated herein by reference in its entirety.

FIELD

Embodiments of the present disclosure generally relate to the field of communications, and in particular, to devices, methods, apparatuses and computer readable storage media of proactive switching of vehicle-to-everything (V2X) communication from a sidelink (SL) connection to a cellular connection.

BACKGROUND

Currently, in the 3rd Generation Partnership Project (3GPP) Release 16, the fifth generation (5G) vehicle-to-everything (V2X) technologies are being developed based on the 3GPP specifications such as 3GPP TR 38.885. The following design aspects are addressed: New Radio (NR) Sidelink (SL) design for V2X; Uu enhancements for advanced V2X use cases; Uu-based SL resource allocation or configuration by Long Term Evolution (LTE) and NR; Radio Access Technology (RAT) and interface selection; Quality of Service (QoS) management; and non-cochannel coexistence between NR and LTE SL. The designs are related to unlicensed Intelligent Transport Systems (ITS) bands and licensed bands in Frequency Range 1 (FR1) and Frequency Range 2 (FR2), up to 52.6 GHz.

As mentioned above, the interface selection is one of the aspects to be addressed in 3GPP Release 16. For example, an upper-layer entity at a V2X user equipment (UE) can select and switch an air interface between a Uu interface and a PC5 interface. According to the specification of related 3GPP TR 38.885, the selection of the radio interface will be performed by the UE at upper layers such as above an access stratum (AS) layer. The selection may be based on the candidate RAT(s) associated with a service type as well as availability information of different interfaces (for example, the Uu interface or a SL interface such as the PC5 interface) received from the AS layer.

As the availability of the Uu and SL interfaces may dynamically change, for example, due to a traffic load, available resources and/or radio link quality of each interface, the selected interface by the upper layer may change from one to another during the lifetime of V2X services. For instance, when a unicast SL connection has already been established between two vehicle UEs for V2X services, the upper layer may trigger the interface reselection or switch to the Uu interface due to the congestion of SL resources or unfulfilled quality of service (QoS) of the V2X services, for example.

The interface reselection or switch decision in each of involved vehicle UEs may be made independently and therefore may not be synchronized among the involved vehicle UEs of the established unicast SL connection. For example, one UE may be configured to switch from SL to Uu for the ongoing V2X service while the other UE may still keep using SL for the same V2X service. In this example, interruption time induced by the interface switch may be prolonged for the ongoing V2X sessions.

SUMMARY

In general, example embodiments of the present disclosure provide devices, methods, apparatuses and computer readable storage media of proactive switching of vehicle-to-everything (V2X) communication from a device-to-device connection to a connection routed by one or more network devices.

In a first aspect, a first terminal device is provided, comprising at least one processor and at least one memory including computer program code. The at least one memory and the computer program code are configured to, with the at least one processor, cause the first terminal device to receive, from a second terminal device via a device-to-device connection, an indication of a decision to switch the device-to-device connection to a connection routed by at least one network device for communication with the second terminal device. The first terminal device is then caused to determine, based on the received indication from the second terminal device, proactive switching from the device-to-device connection to the routed connection to be performed. The first terminal device is further caused to send a request to a first network device of the at least one network device to set up the routed connection, the request indicating a cause for the determined proactive switching.

In a second aspect, a second terminal device is provided, comprising at least one processor and at least one memory including computer program code. The at least one memory and the computer program code are configured to, with the at least one processor, cause the second terminal device to determine that a device-to-device connection for communication with at least a first terminal device is to be switched to a connection routed by at least one network device. The second terminal device is further caused to send, to the at least one first terminal device, an indication of a decision to switch from the device-to-device connection to the routed connection and then perform switching from the device to device connection to the routed connection.

In a third aspect, a method is provided. In the method, the first terminal device receives, from a second terminal device via a device-to-device connection, an indication of a decision to switch the device-to-device connection to a connection routed by at least one network device for communication with the second terminal device. Based on the received indication from the second terminal device, the first terminal device determines proactive switching from the device-to-device connection to the routed connection to be performed. The first terminal device then sends a request to a first network device of the at least one network device to set up the routed connection, the request indicating a cause for the determined proactive switching.

In a fourth aspect, a method is provided. In the method, the second terminal device determines that a device-to-device connection for communication with at least a first terminal device is to be switched to a connection routed by at least one network device. The second terminal device then sends, to the at least one first terminal device, an indication of a decision to switch from the device-to-device connection to the routed connection. Further, the second terminal device performs switching from the device to device connection to the routed connection.

In a fifth aspect, there is provided an apparatus comprising means for performing the method according to the third or fourth aspect.

In a sixth aspect, there is provided a computer readable storage medium that stores a computer program thereon. The computer program, when executed by a processor of a device, causes the device to perform the method according to the third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
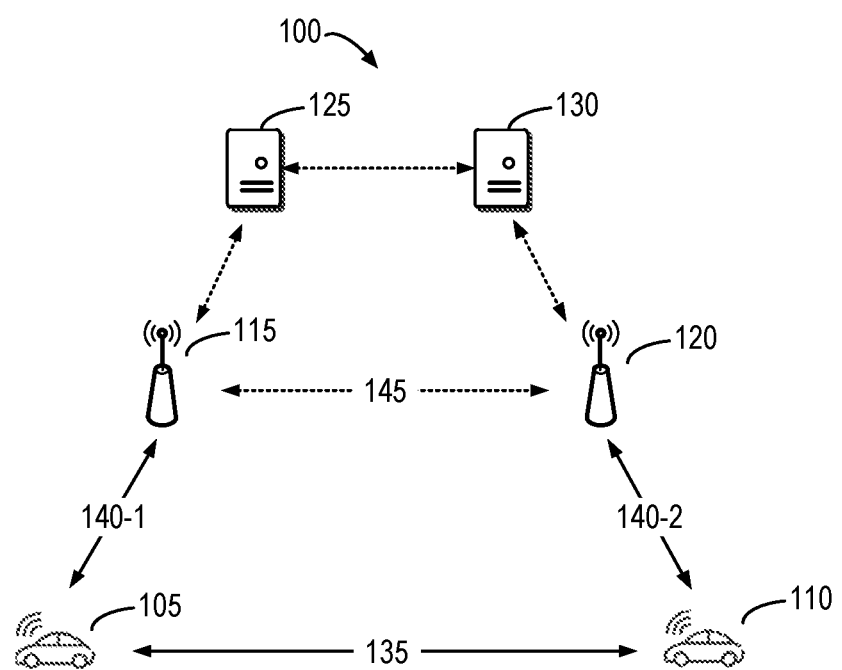
FIG. 1 illustrates an example environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device via which services can be provided to a terminal device in a communication network. The network device may comprise an access network device and a core network device. The access network device may also be referred to as a base station (BS) and may include any suitable device via which a terminal device or UE can access a communication network. Examples of the access network device or BS include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "core network device" refers to a device capable of communicating with the access network device and providing services to the terminal device in a core network. Examples of the core network device may include user plane functions (UPFs), application servers, Mobile Switching Centers (MSCs), MMEs, Operation and Management (O&M) nodes, Operation Support System (OSS) nodes, Self-Organization Network (SON) nodes, positioning nodes, such as Enhanced Serving Mobile Location Centers (E-SMLCs), Mobile Data Terminals (MDTs), Common Control Network Function (CCNF), Access and mobility Management Function (AMF), and/or Network Slice Selection Function (NSSF).

As used herein, the term "user plane function" (UPF) refers to a device, functionality or component for providing various functions in user plane in the core network. The UPF may provide interconnection, packet routing and forwarding and the like between mobile infrastructure and a data network.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the network device on predetermined schedules, when triggered by an internal or external event, or in response to requests from the network side.

Examples of the UE include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, some example embodiments will be described with reference to UEs as examples of the terminal devices, and the terms "terminal device" and "user equipment" (UE) may be used interchangeably in the context of the present disclosure.

As used herein, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The interface selection is one of the aspects to be addressed in 3GPP Release 16. For example, 3GPP TR 38.885 in Section 8 specifies as follows:

---

It is assumed that the candidate RAT(s) for SL transmission are associated with a service type by upper layers. A given V2X service type may be associated with: 1) LTE RAT only, 2) NR RAT only, 3) LTE or NR RAT, or 4) LTE and NR RAT. RAT selection is performed by upper layers and applied only to V2X SL broadcast transmission. V2X SL unicast and groupcast transmissions can only be performed over NR. A Tx profile-based approach is the baseline for SL RAT selection. For Uu/PC5 interface selection, the UE AS signals to UE upper layers the Uu/PC5 availability information, and UE upper layers select the radio interface.
In particular, for the Uu interface, the UE in-coverage/out-of-coverage status is used as the baseline to determine the Uu interface availability/unavailability for V2X communication.
It is up to UE implementation how the UE AS signals the Uu interface availability/unavailability information to UE upper layers, i.e. when the signalling is triggered and what the content of the signalling is.

---

According to the specification of related 3GPP TR 38.885, the selection of the radio interface will be performed by the UE at upper layers such as above an access stratum (AS) layer. Conventionally, the interface reselection or switch decision in each of the involved vehicle UEs may be made independently. Therefore, there may not be synchronization in term of the interface reselection among the involved vehicle UEs, which may prolong the interruption time due to the interface switch initiated at one of the involved UEs for the ongoing V2X sessions. In addition, the involved UEs may be in an IDLE/INACTIVE or CONNECTED/ACTIVE state of one or more serving cells belonging to one or more Public Land Mobile Networks (PLMNs). Thus, an end-to-end (E2E) connection via the Uu interface between the involved UEs may be enabled with different routes (or data forwarding paths). For example, when the involved UEs are served by one NR NodeB (for example, gNB), the E2E connection may be routed via this gNB and through no core network if an optimal data forwarding path is applied. In another example, the E2E connection may be routed through core networks via some common servers when the involved UEs are served by different PLMNs.

According to connection and session management procedures defined in NR, for example, in 3GPP TS 23.501 and 23.502, when one UE (denoted as UE #1) is configured to switch from the SL interface to the Uu interface for the ongoing V2X services, UE #1 needs to set up a new protocol data unit (PDU) session to a network (NW), or modify an existing PDU session to request V2X service resuming from a V2X application server. Then, V2X application server may request the NW to reach the other UE (denoted as UE #2) and trigger UE #2 to set up or modify the corresponding PDU session to the NW for the same V2X service if the interface switch has not been triggered in UE #2 yet. If UE #2 is in an idle state, the NW needs to page UE #2 first. Then, UE #2 needs to get into a connected state of the NW and initiates a PDU session establishment procedure. Only after the PDU sessions have been established by both UE #1 and UE #2, the communication for the ongoing V2X services can be resumed.

There is a need to reduce latency of setting up the E2E connection via the Uu interface for an ongoing unicast/groupcast SL communication of UEs when one of the UEs decides to reselect the Uu interface and therefore switch from the SL interface to the Uu interface.

Embodiments of the present disclosure provide a mechanism for proactively switching an E2E connection between two terminal devices (for example, UEs) during interface reselection or switch from an SL interface to a Uu interface to reduce the latency and the service interruption. According to the mechanism, when a terminal device determines that a device-to-device (D2D) connection (for example, a sidelink connection) for communication with a further terminal device is to be switched to a connection routed by one or more network devices, the terminal device sends an indication or request over SL for the switching to the further terminal device. Then, the further terminal device can proactively initiate the switching from the D2D connection to the routed connection, instead of waiting for a trigger from the network or network device(s) to initiate the switching.

In this way, the connection or interface switch from SL to Uu can be performed proactively by the terminal devices. Conventionally, the receiver UE will be triggered by the network to set up the connection via the Uu interface only after the transmitter UE has set up its connection via the Uu interface. According to the mechanism of the present disclosure, the receiver UE can proactively switch the connection or interface based on the request received from the transmitter UE over SL. Thus, the connection setup of the individual UEs via Uu can take place in a parallel manner, which may reduce the latency for setting up the E2E connection via Uu due to the interface switch initiated by the transmitter UE.

FIG. 1 shows an example environment 100 in which embodiments of the present disclosure can be implemented. The environment 100, which is a part of a communication network, comprises two terminal devices 105 and 110, two base stations (BSs) 115 and 120 and two user plane functions (UPFs) 125 and 130, which will be referred to as a first terminal device 105, a second terminal device 110, a first base station 115, a second base station 120, a first UPF 125 and a second UPF 130, respectively, for the purpose of discussion.

It is to be understood that two terminal devices, base stations and/or UPFs are shown in FIG. 1 only for the purpose of illustration, without suggesting any limitation. Any suitable number of terminal devices, base stations and UPFs may be included in the environment 100. In addition, the environment 100 may include any suitable other devices, functions and elements such as V2X application servers.

The first terminal device 105 can communicate with the second terminal device 110 via a D2D connection. In this example, the D2D connection is implemented by a sidelink (SL) connection over a sidelink interface 135. The applications of D2D may include V2X, public safety, Internet of Things (IoT), proximity communication and the like. The communication may be performed in any suitable D2D transmission mode using unicast or multicast. The D2D transmission mode may comprise a SL transmission mode 1 (with network scheduled resource allocation) or a SL transmission mode 2 (with UE selected resource allocation). For example, the second terminal device 110 may multicast signals to other terminal devices (not shown) than the first terminal device 105. The first and second terminal devices 105 and 110 can also communicate with the first and second BSs 115 and 120 over Uu interfaces 140-1 and 140-2 (collectively or individually referred to as a Uu interface 140). The first and second base stations 115 and 120 can communicate over an X2 or Xn interface 145 or via the first and second UPFs 125 and 130.

The communications in the environment 100 may follow any suitable communication standards or protocols such as Universal Mobile Telecommunications System (UMTS), long term evolution (LTE), LTE-Advanced (LTE-A), the fifth generation (5G) NR, Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, machine type communication (MTC), enhanced mobile broadband (eMBB), massive machine type communication (mMTC), ultra-reliable low latency communication (URLLC), Carrier Aggregation (CA), Dual Connection (DC), New Radio Unlicensed (NR-U) and V2X technologies.

It is to be understood that the two terminal devices 105 and 110 are shown to be served by different base stations 115 and 120 and different UPFs 125 and 130 only for the purpose of illustration, without suggesting any limitation. In some example embodiments, the two terminal devices 105 and 110 may be served by the same UPF, or even by the same BS.

In the environment 100, the second terminal device 110 can transmit data to the first terminal device 105 via the SL connection over the SL interface 135. If the second terminal device 110 determines the SL connection is to be switched to the Uu connection routed by the network devices such as the BSs 115 and 120, and/or the UPFs 125 and 130, the second terminal device 110 will send to the first terminal device 105 an indication of a decision to switch the SL connection to the Uu connection. Then, the first terminal device 105 may initiate the step of the routed Uu connection based on the received indication message.

Figure 2:
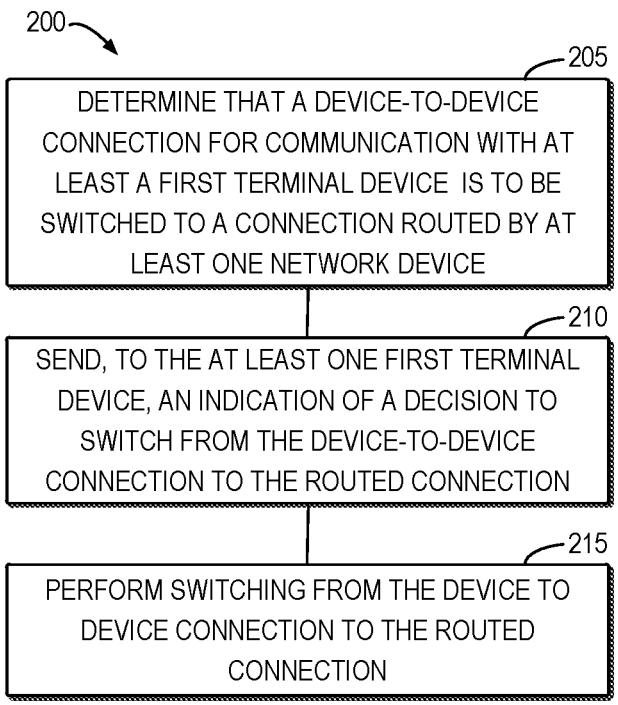
FIG. 2 illustrates a flowchart of an example method according to some example embodiments of the present disclosure.

FIG. 2 shows a flowchart of an example method 200 for the connection switching according to some example embodiments of the present disclosure. The method 200 can be implemented by the second terminal device 110 as shown in FIG. 1. For the purpose of discussion, the method 200 will be described with reference to FIG. 1.

As shown, at block 205, the second terminal device 110 determines that the D2D connection for communication with the first terminal device 105 is to be switched to a connection routed by at least one network device such as the first and second BSs 115 and 120 and even the UPFs 125 and 130.

The determination may be performed by the second terminal device 110 according to any suitable rules. The rules may involve many events or reasons based on network configurations. For example, if the second terminal device 110 receives one or more scheduling request rejections for the communication via the D2D connection, the second terminal device 110 may determine that the connection switching is triggered. These rejections may be received by the second terminal device 110 (dis)continuously in a row. The number of rejections to trigger the switching may be either configured by the network or depending on the specific implementations at the second terminal device 110.

As another example, if the second terminal device 110 may receive a scheduling request rejection indicating the switching, the second terminal device 110 may determine the switching to be triggered. The rejection may be received after the second terminal device 110 sends a request for transmission resources for the D2D communication.

As yet another example, if a traffic load via the D2D connection is too high, for example, above a threshold load, the second terminal device 110 may determine that the switching is triggered. The traffic load may be determined or evaluated at the second terminal device 110. Alternatively or in addition, the second terminal device 110 may receive an indication from the network that the traffic load via the first connection is above a certain threshold load. This indication can be transmitted by the network in a broadcast manner via system information block or in a dedicated manner by RRC signaling or downlink control information (DCI).

In some example embodiments, the second terminal device 110 may receive, from an upper layer above an access stratum (AS) layer (such as a V2X layer or an application layer), an indication that the device-to-device connection is to be switched to the routed connection. Alternatively or in addition, the second terminal device 110 may receive, from the AS layer, an indication that a specific device-to-device transmission mode (such as SL mode 1) is unavailable. Further, the second terminal device 110 may make the decision for the switching.

In some example embodiments, the second terminal device 110 may be configured by the network or by the upper layers (for example above the AS layer) to switch an air interface from the SL interface 135 (such as the PC5 interface) to the Uu interface 140. Accordingly, the second terminal device 110 can determine that the connection switching is to be performed.

After the switching is determined, at block 210, the second terminal device 110 sends to the first terminal device 110 an indication of a decision to switch from the D2D connection to the routed connection. The indication is sent via the D2D connection. Using this indication, the second terminal device 110 may indicate or notify the first terminal device 105 over SL that the ongoing SL communications are to be switched to the Uu interface, for example. With this indication, the first terminal device knows that it should start to prepare for the connection via the Uu interface, instead of waiting for an indication coming from the network or network device(s).

The indication may be sent in SL mode 1 or mode 2 by unicast or multicast. In some example embodiments, the request may be sent in an application-layer message. In some other example embodiments, the request may be sent in an AS-layer message to further reduce the time of the switching.

In some example embodiments, the indication may contain some context information of the second terminal device 110, such as a cell identifier (ID) and a PLMN ID. The indication may contain other UE assistant information such as a cellular-access temporary identifier of the second terminal device 110. The cellular-access temporary identifier may be a non-access stratum (NAS) ID such as Temporary Mobile Subscriber Identity (TMSI) in the case that the second terminal device 110 is in an IDLE state, or AS ID such as Inactive Radio Network Temporary Identifier (I-RNTI) in the case that the second terminal device 110 is in an INACTIVE state, or Cell Radio Network Temporary Identifier (C-RNTI) in the case that the second terminal device 110 is in a CONNECTED state. These contexts may help the first terminal device 105 to perform the connection switching. Example embodiments in this regard will be detailed in the following paragraphs with reference to FIG. 3.

The indication may be sent by the second terminal device 110 at the earliest possible, for example, right after the second terminal device 110 determines the switching to be performed, no matter whether the second terminal device 110 is in a connected state or not. For example, if the network supports routing of the V2X services via the BSs 115 and 120 for an optimal data forwarding path, the second terminal device 110 may send the indication immediately.

In some example embodiments, the second terminal device 110 may send the indication after the switching is allowed by the network. For example, after the second terminal device 110 determines that the switching is to be triggered, the second terminal device 110 may first send a request for the switching to a network device such as the second base station 120. For example, this request may be carried by the RRC setup request message, implicitly or explicitly. If a response is received from the base station 120 which indicates that the switching is allowed, the second terminal device 110 may send the indication to the first terminal device 105. For example, the response may be carried by the RRC connection setup message, implicitly or explicitly. In this way, the admission control by the network for the requested switching can be reassured to the second terminal device 110 before triggering the first terminal device 105 by the indication for the switching over SL to initialize the routed connection via Uu.

At block 215, the second terminal device 110 performs the switching from the D2D connection to the routed connection. In some example embodiments, the second terminal device 110 may determine whether a regular cellular access PDU session is required for the communication via the routed connection. In the context of the present disclosure, the regular cellular access PDU session refers to a PDU session that is served with a regular path routed via a core network (CN) or network devices in the CN such as the UPFs 125 and/or 130.

For example, the second terminal device 110 may be aware of a serving cell of the first terminal device 105 by exchanging information with the first terminal device 105. If the first and second terminal devices 105 and 110 are served by different PLMNs, the second terminal device 110 may determine that a PDU session served by the CN is required. As another example, the second terminal device 110 may receive an indication from the network such as the second BS 120 to indicate whether the PDU session is required.

The indication sent to the first terminal device 105 may indicate whether a PDU session served by the CN is required for the second communication. For example, the second terminal device 110 may be aware of a serving cell of the first terminal device 105 by exchanging information with the first terminal device 105. If the first and second terminal devices 105 and 110 are served by different PLMNs, the second terminal device 110 may determine that a PDU session served by the CN is required and use the indication to indicate the requirement. As another example, the second terminal device 110 may determine the requirement of the PDU session according to the configuration by the network.

If the PDU session served by the CN is required, in the case that the second terminal device 110 is in the connected state, the second terminal device 110 may determine a PDU session for the communication via the routed connection for example over the Uu interface 140. The second terminal device 110 may determine whether a proper PDU session is available. For example, the second terminal device 110 may have multiple PDU sessions to different APNs. The second terminal device 110 may determine whether there is a PDU session that is connected to the APN for V2X services. If a PDU session is determined, the second terminal device 110 determines whether a proper QoS flow of the PDU session is available. For example, from multiple QoS flows, the second terminal device 110 determines a QoS flow that can support the QoS requirements of the ongoing V2X services.

If a proper PDU session is available but no proper QoS flow of the PDU session is available, the second terminal device 110 may add a new QoS flow into the PDU session for the communication. Alternatively, the second terminal device 110 may adjust a current QoS flow of the PDU session for the communication. If no proper PDU session is available, the second terminal device 110 may initiate setup of a PDU session. If the second terminal device 110 is in an idle or inactive state, the second terminal device 110 may first establish a RRC connection.

In some example embodiments, the second terminal device 110 may send the indication to the first terminal device 105 after the second terminal device 110 has established the RRC connection and initiated a PDU session setup. This may ensure that the second terminal device 110 can pass the admission control to the network before it sends the indication. In this case, the indication may indicate to the first terminal device 105 whether a PDU session is required. This indication can help the first terminal device 105 to determine and initiate the proper Uu connection setup, immediately.

In some example embodiments, the final decision with respect to the requirement of the PDU session may be derived at the network side. Many aspects may be considered, including, for example, the used capacity and/or an available capacity of an X2 or Xn interface between the base stations 115 and 120 serving the terminal devices 105 and 110. In this case, the indication may indicate to the first terminal device 105 to wait for a further indication from the network to indicate whether the PDU session is required. Upon receiving that indication, the first terminal device 105 proactively transit to the RRC_Connection/Active state, without waiting for a trigger from the network or network device(s).

This determination and setup of the PDU session may be performed after the indication is sent to the first terminal device 105. As such, the connection setup may be initiated at both the first and second terminal devices 105 and 110 in parallel. Accordingly, the latency or service interruption time may be reduced.

In some example embodiments, after sending the indication for the switching to the first terminal device 105, the second terminal device 110 may temporarily continue the D2D communication with the first terminal device 105 via the D2D connection, for example, in SL mode 2 before the routed Uu connection is established. In this way, the traffic interruption may be further reduced.

In some example embodiments, the second terminal device 110 may receive an acknowledgement for the switching from the first terminal device 105 via the D2D connection. Based on the acknowledgement, the second terminal device 110 may determine that the switching is acknowledged or even done by the first terminal device 105. Then, the second terminal device 110 may prepare for the communication with the first terminal device 105 via the connection routed by one or more network devices such as the first and second BSs 115 and 120 and even the first and second UPFs 125 and 130.

Figure 3:
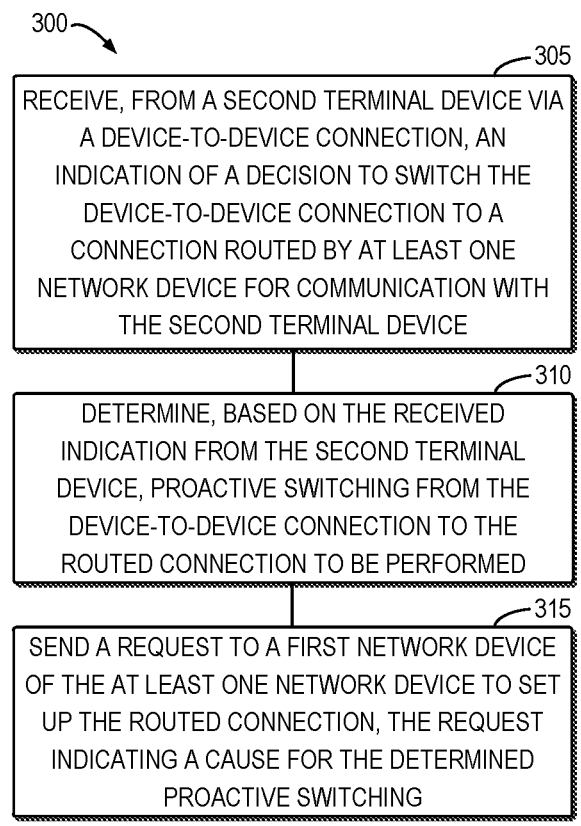
FIG. 3 illustrates a flowchart of an example method according to some other example embodiments of the present disclosure.

FIG. 3 shows a flowchart of an example method 300 for the connection switching according to some example embodiments of the present disclosure. The method 300 can be implemented by the first terminal device 105 as shown in FIG. 1. For the purpose of discussion, the method 300 will be described with reference to FIG. 1.

At block 305, the first terminal device 105 receives, from the second terminal device 110 via the D2D connection, an indication of a decision to switch from the D2D connection to a connection routed by one or more network devices such as the BSs 115 and 120 and/or the UPFs 125 and 130. At block 310, based on the received indication from the second terminal device 110, the first terminal device 105 determines proactive switching from the device-to-device connection to the routed connection to be performed.

In some example embodiments, the first terminal device 105 may determine whether a PDU session served by the CN is required for the second communication. For example, in the example embodiments where the indication indicates that the PDU session is required, the first terminal device 105 may determine that the PDU session is required for the second communication. As another example, if the first terminal device 105 receives, from the second terminal device 110 an indication to wait for a further indication from the network to indicate whether the PDU session is required, and from a network device such as the first base station 115, an indication that the packet data unit session is required, the first terminal device 105 may determine that the PDU session is required for the second communication.

In some example embodiments, if the indication contains the contexts of the second terminal device 110 such as the cell ID and/or the PLMN ID, the first terminal device 105 may prioritize reselection of the cell or PLMN that is serving the second terminal device 110. For example, the first terminal device 105 may determine whether it can be served by the same cell or in the same PLMN as the second terminal device 110. The first terminal device 105 may access either to the serving cell or to the PLMN of the second terminal device 110. If the two terminal devices are served by the same cell or the same PLMN, the first terminal device 105 may send an indication of the switching to the first BS 115. The indication contains the received UE context of the second terminal device 110 such as the radio level identifiers and some UE assistance information on the SL-to-Uu switch so that the network may decide and select the most optimized routing for the communication between the first and second terminal devices 105 and 110.

If the connection can be routed by the network devices, the first terminal device 105 may determine that a PDU session served by the CN is not required. As an example, if 5G radio access network (5G-RAN) has capability to re-route the uplink (UL) transmission of the second terminal device 110 to the downlink (DL) transmission of the first terminal device 105 and identifies that both the first and second terminal device 105 and 110 are connected to the same 5G-RAN nodes or different 5G-RAN nodes with the Xn interface, 5G-RAN may indicate to the first terminal device 105 that 5G-RAN will take care of the second communication, which means that a PDU session is not required for the ongoing V2X service.

In the case that the PDU session is required, if the first terminal device 105 is in a connected state, the first terminal device 105 may determine a PDU session for the communication via the routed Uu connection. The first terminal device 105 may determine whether a proper PDU session is available and whether a proper QoS flow of the PDU session is available. If a proper PDU session is available but no proper QoS flow of the PDU session is available, the first terminal device 105 may add a new QoS flow into the PDU session for the communication or adjust a QoS flow of the PDU session for the communication. If no proper PDU session is available, the first terminal device 105 may initiate setup of a PDU session.

At block 315, the first terminal device 105 sends a request to the first network device (for example, the first BS 115) of the at least one network device to set up the routed connection. The request indicates a cause for the determined proactive switching. For example, if the first terminal device 105 is in a RRC IDLE or INACTIVE state, the first terminal device 105 may be triggered by the switching indication to initiate a RRC connection establishment/resume procedure without a need of waiting for paging when an incoming call from the second terminal device 110 is expected until the data of the second terminal device 110 is arriving via a common application server. In some example embodiments, the first terminal device 105 may send a request for establishing or resuming a RRC connection, upon receiving the switching indication. The request may contain the cause for the determined proactive switching. As an example, a new RRC connection establishment/resume cause may be used to indicate that an incoming call is expected due to the connection switching. The first terminal device 105 may indicate the cause in the establishment/resume request to indicate the connection switching. This can help the first terminal device 105 to get connected with 5G-RAN as fast as possible. Accordingly, the first terminal device 105 may be ready to either send a PDU session related request to the NW or receive a trigger to set up a PDU session or other requests for the targeted V2X services with the second terminal device 110.

In some example embodiments, the proactive connection setup for the first terminal device 105 may bypass or at least put off a part of an Authentication Authorization Accounting (AAA) procedure until the common application server is trying to reach the first terminal device 105. In this case, the serving network of the first terminal device 105 may configure some enforced deactivation/release timer for the established connection for the first terminal device 105. The configured timer starts upon the setup of the PDU session for the first terminal device 105. If the network does not receive any actual data for the established PDU session or an explicit request from the second terminal device 120 to renew the timer, then the PDU session is deactivated or released autonomously.

After both the first and second terminal devices 105 and 110 set up the connection to NW, the V2X communication for the ongoing V2X services can be resumed via the connection such as over the Uu interface 140. In some example embodiments, the first terminal device 105 may send an acknowledgement for the switching to the second terminal device 110 via the D2D connection to cause the initiation of the communication via the routed connection.

In the conventional approach, the first terminal device 105 can only react after the arrival of data from the second terminal device 110, which will trigger the paging for the first terminal device 105 if the first terminal device 105 is in inactive or idle state. The switching is subject to significant delay because the PDU session setup for the second terminal device 110 may need to be completed, the data from the second terminal device 110 to the first terminal device 105 via a server may be sent on the established PDU session, and the data triggers the paging for the first terminal device 105 to initialize the PDU session setup before the switching can be performed. According to example embodiments of the present disclosure, the first terminal device 105 will proactively switch the D2D connection to the connection routed by one or more network devices in response to receiving the indication from the second terminal device 110. Thus, the connection or PDU setup related to the two terminal devices 105 and 110 may take place in a parallel manner, which can reduce the latency for setting up the E2E connection via the Uu interface.

All operations and features as described above with reference to FIG. 2 are likewise applicable to the method 300 and have similar effects. For the purpose of simplification, the details will be omitted.

Figure 4:
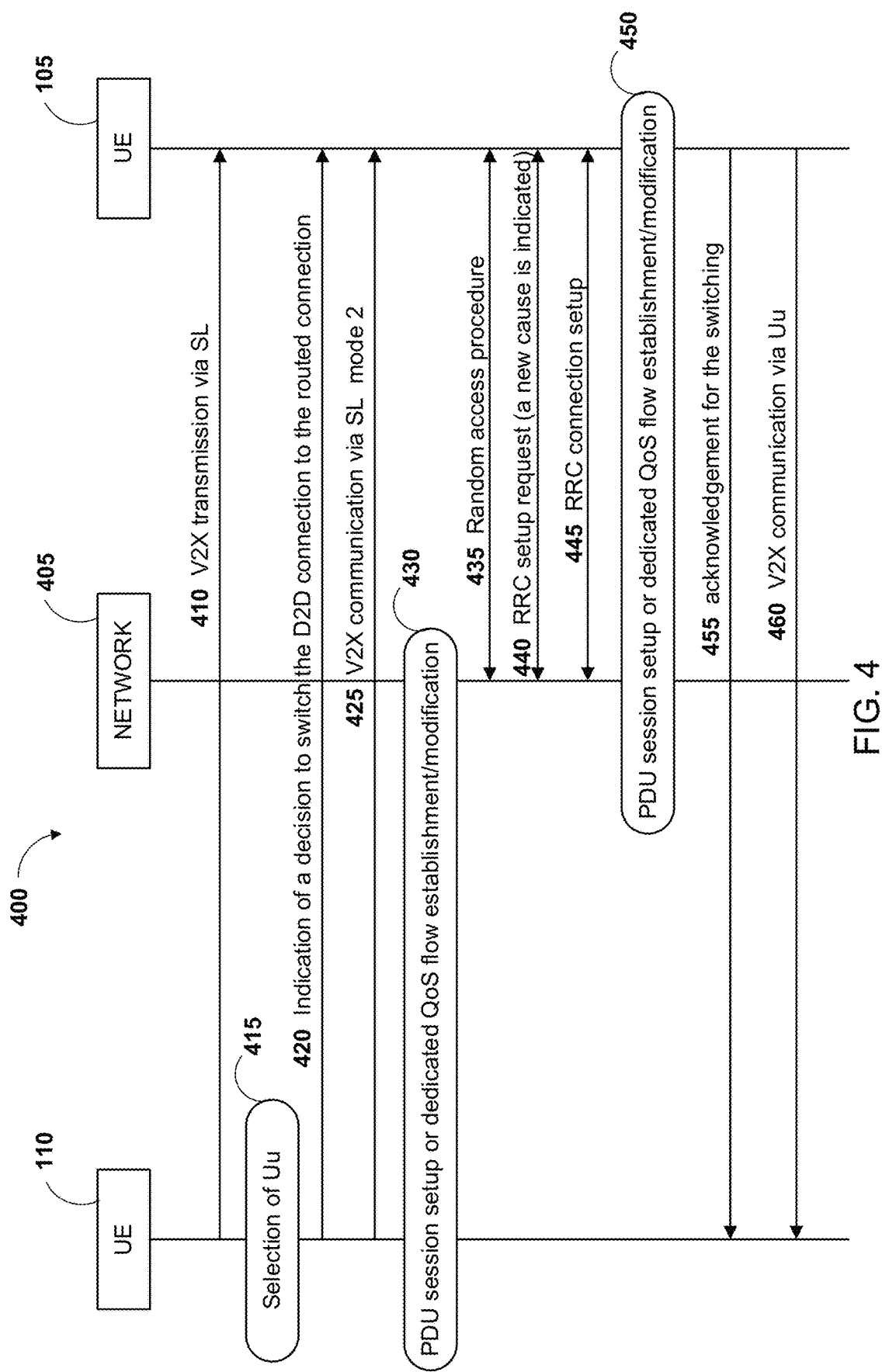
FIG. 4 illustrates an example signaling flow according to some example embodiments of the present disclosure.

FIG. 4 shows an example signaling flow 400 between various devices according to some example embodiments of the present disclosure. In this example, a network 405 may comprise different network entities such as the first and second base stations 115 and 120, the first and second UPFs, a V2X application (APP) server and the like. The terminal devices 105 and 110 are implemented by UEs.

At the beginning, the second terminal device 110 performs (410) V2X transmission to the first terminal device 105 via SL transmission mode 1 or mode 2, using unicast or multicast. The second terminal device 110 determines (415), for example, by configuration either by the network or by its upper layers, the selection of the Uu interface for switching the SL connection over the PC5 interface to the connection over the Uu interface. The events or reasons to trigger the switch based on network configuration may be as follows:
  a) The second terminal device 110 receives one or multiple scheduling request rejection message(s) in a row. The number of rejection messages to trigger the interface switch can be either configured by the network or by UE-implementation.
  b) When the second terminal device 110 requests the transmission resource for SL mode 1, it receives a scheduling request rejection message containing the indication to trigger the interface switch to Uu.
  c) The second terminal device 110 receives an indication from the network that the traffic load on the PC5 interface is above certain threshold. This indication can be transmitted in a broadcast manner via system information block, in a dedicated manner by RRC signaling or downlink control information (DCI).

The second terminal device 110 transmits (420) the indication of a decision to switch from the SL connection to the Uu connection in SL mode 1 or mode 2 to the first terminal device 105 using unicast or multicast, in order to trigger the interface switch from PC5 to Uu. In order to obtain a fast interface switch, the indication may be sent in the AS layer, instead of in the application layer. The indication may indicate one of the two options for the first terminal device 105, including:
  a) The first terminal device 105 needs to prepare for a PDU session to receive the packets of the second terminal device 110 via Uu.
  b) The first terminal device 105 should set up an RRC connection and wait for further indications from the network whether a PDU session is required.

In addition, the indication may contain some context information of the second terminal device 110, such as its detected cell ID, PLMN ID, UE assistant information, and the like.

The second terminal device 110 still performs (425) the V2X communication with the first terminal device 105 in SL mode 2 before the connection via the Uu interface is ready, for example, according to the configuration of the network 405 or the UE upper layers.

The second terminal device 110 performs (430) PDU session setup or dedicated QoS flow establishment/modification. For example, the second terminal device 110 needs to check the conditions as follows:
  a) if there is already a PDU session to a access point name (APN) for V2X communication, and
  b) if an involved QoS flow of that PDU session can meet the QoS requirements of the V2X service(s).

Based on the above checking:
  i. If condition a) is fulfilled, that is, there is no PDU session to the APN for V2X communication, the second terminal device 110 needs to establish a new PDU session.
  ii. If condition a) is fulfilled but condition b) is not fulfilled, that is, there is a proper PDU session but the QoS requirements of the V2X service(s) cannot be met via the existing QoS flow(s), an additional QoS flow needs to be established to meet the QoS requirements, or the current QoS flow needs to be modified.
  iii. If both conditions a) and b) are fulfilled, the second terminal device 110 can utilize the current PDU session and the current QoS flow.

Upon the reception of the indication, the first terminal device 105 needs to check whether it should establish a new PDU session or an additional QoS flow. In this example, the first terminal device 105 is in the RRC_Idle or RRC_Inactive state. Accordingly, the first terminal device 105 needs to transit to the RRC_Connected state.

As shown, the first terminal device 105 performs (435) a random access (RA) procedure at first. After the RA procedure, the first terminal device 105 sends (440) an RRC setup request message where a new cause of "expecting an incoming call" or "switching from SL to Uu" is indicated in this message. The new cause can help the first terminal device 105 to set up the RRC connection as fast as possible. Upon receiving the RRC setup request message, the network sends (445) an RRC connection setup message back to the first terminal device 105.

If the first terminal device 105 was already in the RRC_Connected state, the first terminal device 105 performs (450) PDU session setup or dedicated QoS flow establishment/modification. For example, the first terminal device 105 can either set up a new PDU session or add an additional QoS flow.

Once the PDU session is ready, the first terminal device 105 may send (455) an acknowledgement for the switching to the second terminal device 110 in SL mode 1 or mode 2. The AS layer at the second terminal device 110 indicates the availability of the Uu interface and, therefore, the upper layers can select the Uu interface from now on. Then, the second terminal device 110 performs (460) the V2X communication via the Uu interface.

Figure 5:
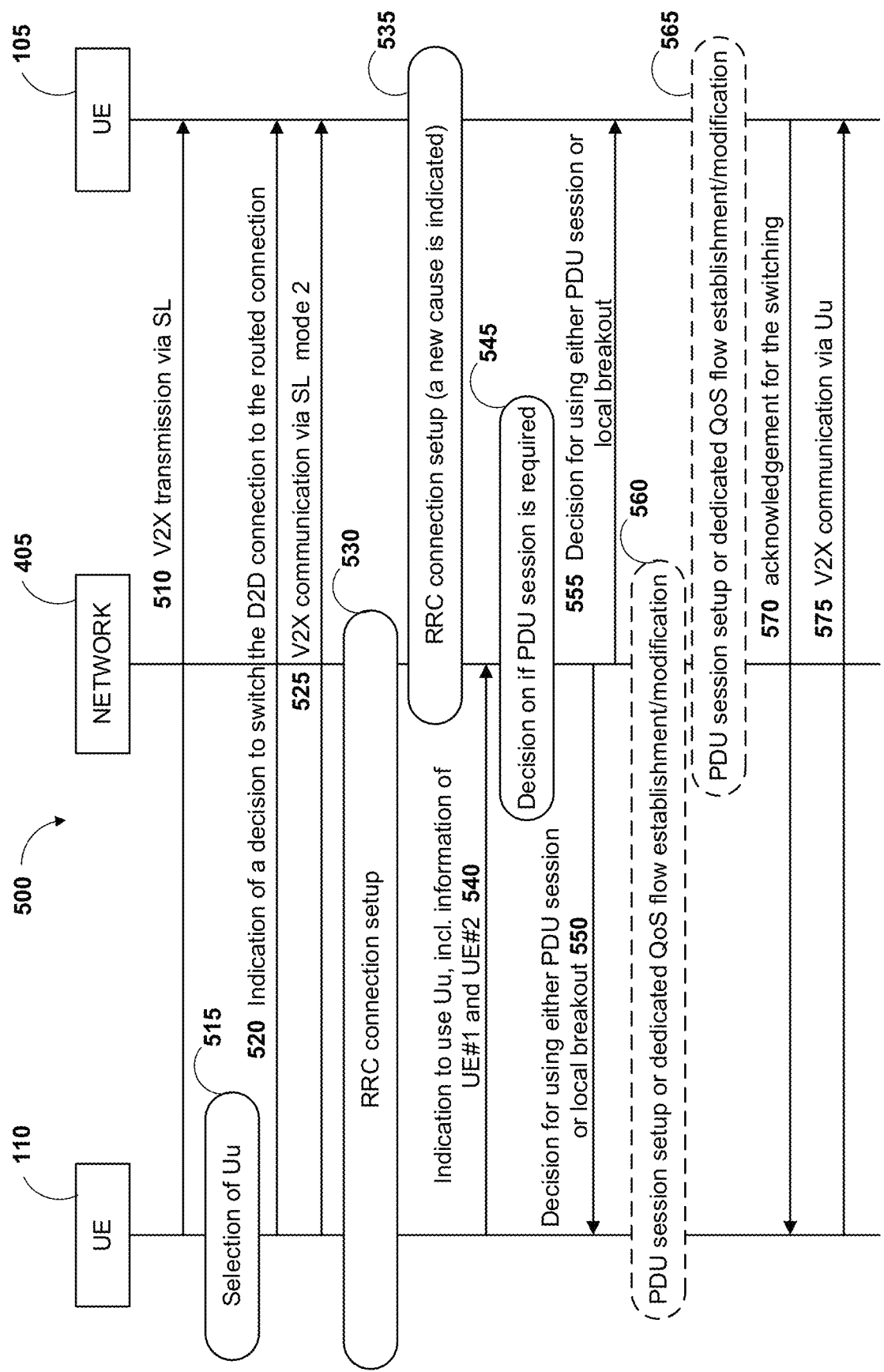
FIG. 5 illustrates an example signaling flow according to some other example embodiments of the present disclosure.

FIG. 5 shows an example signaling flow 500 between various devices according to some example embodiments of the present disclosure.

In the flow 500, the operations and actions at 510 to 525 are similar to the operations and actions at 410 to 425, and the details thereof will not be repeated for the purpose of simplification.

In case both the first and second terminal devices 105 and 110 are in the RRC_Inactive or RRC_Idle state, and the two terminal devices 105 and 110 need to transit to the RRC_Connected state. As shown, the second terminal device 110 performs (530) the RRC connection setup. The first terminal device 105 also performs (535) the RRC connection setup. During this RRC connection setup procedure, the first terminal device 105 sends the new cause of "expecting an incoming call" or "switching from SL to Uu" in its RRC setup request message.

The second terminal device 110 sends (540) its own information with/without the information of the first terminal device 105 to the serving base station 120 to indicate that it wants to transmit the V2X services towards the first terminal device 105 via the Uu interface. The information of the first terminal device 105 can be collected before the decision to switch the connection or interface. Alternatively, the second terminal device 110 may query the first terminal device 105 for the required information once it decides to switch the interface. Moreover, the information sent to the network 405 (such as the second base station 120) may include the application-layer and/or AS-layer information to help the network to determine the Uu connection setup for the terminal devices.

The network 405 makes (545) a decision whether the PDU session is required. For example, the first base station 115 can interact with other network entities to decide if 5G RAN can locally route the traffic from the second terminal device 110 to the first terminal device 105 without using PDU sessions. The network 405 sends (550) the decision to the second terminal device 110 and also sends (555) the decision to the first terminal device 105.

For example, if 5G RAN does not have the ability to locally route the traffic from the second terminal device 110 to the first terminal device 105, the network 405 may send a message to the second terminal device 110 to indicate that the second terminal device 110 needs to establish a PDU session. A message with the same indication may be transmitted to the first terminal device 105 if the first and second terminal device 105 and 110 are served by the same BS. If the first and second terminal devices 105 and 110 are served by two different BSs, the serving BS 120 of the second terminal device 110 can send the message to the first terminal device 105 through the serving BS 115 of the first terminal device 105.

Then, the second terminal device 110 may perform (560) the PDU session setup or dedicated QoS flow establishment/modification, and the first terminal device 105 may perform (565) the PDU session setup or dedicated QoS flow establishment/modification.

If 5G RAN has the capability to locally route the traffic from the second terminal device 110 to the first terminal device 105, the network 405 may send a message to the second terminal device 110 to indicate that the second terminal device 110 does not need to establish a PDU session. Thus, the second terminal device 110 can rely on 5G RAN to transmit its data to the first terminal device 105. A message with the same indication may be transmitted to the first terminal device 105 if the first and second terminal device 105 and 110 are served by the same BS. If the first and second terminal devices 105 and 110 are served by two different BSs, the serving BS 120 of the second terminal device 110 can send the message to the first terminal device 105 through the serving BS 115 of the first terminal device 105. Afterwards, the second terminal device 110 and the first terminal device 105 skip the PDU session setup or dedicated QoS flow establishment/modification.

The first terminal device 105 may send (570) an acknowledgement for the switching to the second terminal device 110 by SL mode 1 or mode 2. Then, the second terminal device 110 performs (575) V2X communication to the first terminal device 105 via the Uu interface.

Figure 6:
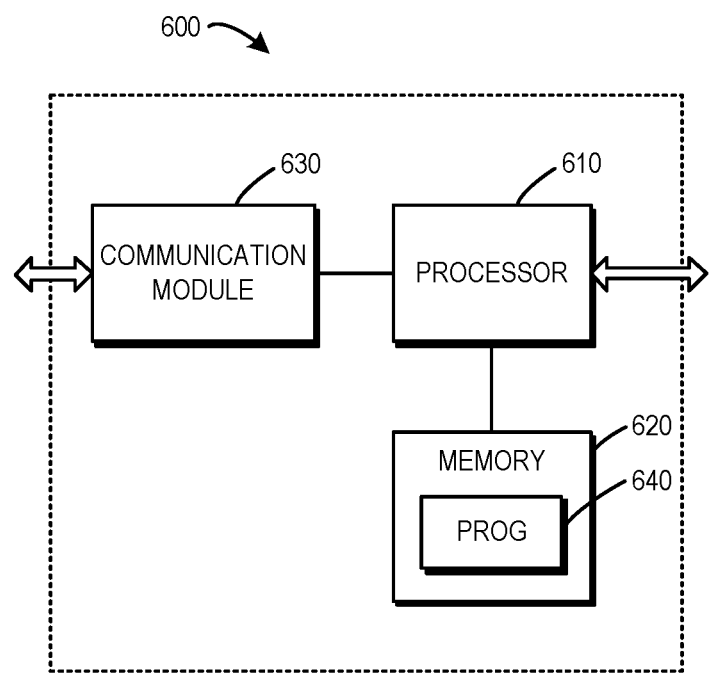
FIG. 6 illustrates a simplified block diagram of a device that is suitable for implementing embodiments of the present disclosure.

FIG. 6 is a simplified block diagram of a device 600 that is suitable for implementing embodiments of the present disclosure. The device 600 can be implemented at the second terminal device 110 or the first terminal device 105 as shown in FIG. 6.

As shown, the device 600 includes a processor 610, a memory 620 coupled to the processor 610, a communication module 630 coupled to the processor 610, and a communication interface (not shown) coupled to the communication module 630. The memory 620 stores at least a program 640. The communication module 630 is for bidirectional communications, for example, via multiple antennas. The communication interface may represent any interface that is necessary for communication.

The program 640 is assumed to include program instructions that, when executed by the associated processor 610, enable the device 600 to operate in accordance with the embodiments of the present disclosure, as discussed herein with reference to FIGS. 2 to 5. The embodiments herein may be implemented by computer software executable by the processor 610 of the device 600, or by hardware, or by a combination of software and hardware. The processor 610 may be configured to implement various embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

When the device 600 acts as the second terminal device 110 or a part of the second terminal device 110, the processor 610 and the communication module 630 may cooperate to implement the method 200 and the flows 400 and 500 as described above with reference to FIGS. 2, 4 and 5. When the device 600 acts as the first terminal device 105 or a part of the first terminal device 105, the processor 610 and the communication module 630 may cooperate to implement the method 300 and the flows 400 and 500 as described above with reference to FIGS. 3 to 5. All operations and features as described above with reference to FIGS. 2 to 5 are likewise applicable to the device 600 and have similar effects. For the purpose of simplification, the details will be omitted.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 200 and 300 and the flows 400 and 500 as described above with reference to FIGS. 2 to 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

In some aspects, a first terminal device, comprising: at least one processor; and at least one memory including computer program code; the at least one memory and the computer program code configured to, with the at least one processor, cause the first terminal device to: receive, from a second terminal device via a device-to-device connection, an indication of a decision to switch the device-to-device connection to a connection routed by at least one network device for communication with the second terminal device; determine, based on the received indication from the second terminal device, proactive switching from the device-to-device connection to the routed connection to be performed; and send a request to a first network device of the at least one network device to set up the routed connection, the request indicating a cause for the determined proactive switching.

In some example embodiments, the first terminal device is further caused to: send, to the second terminal device via the device-to-device connection, an acknowledgement for the switching.

In some example embodiments, the first terminal device is further caused to: determine whether a packet data unit session served by a core network is required for the communication via the routed connection; and in response to determining that the packet data unit session is required, determine the packet data unit session.

In some example embodiments, the first terminal device is caused to determine whether the packet data unit session is required by: determining whether the indication indicates that the packet data unit session is required; and in response to the indication indicating that the packet data unit session is required, determining that the packet data unit session is required.

In some example embodiments, the first terminal device is caused to determine whether the packet data unit session is required by: receiving, from a first network device of the at least one network device, an indication that the packet data unit session is required; and determining that the packet data unit session is required.

In some example embodiments, the indication contains context information of the routed connection associated with the second terminal device.

In some example embodiments, the context information contains at least one of a cell identifier and a public land mobile network identifier associated with the second terminal device, and the first terminal device is further caused to determine whether the packet data unit session is required by: determining, with the cell identifier or the public land mobile network identifier, whether the first terminal device is served by the same cell or the same public land mobile network as the second terminal device; and in response to determining that the first terminal device is served by the same cell or the same public land mobile network as the second terminal device, sending an indication for the switching to a first network device of the at least one network device, the indication containing the context information.

In some example embodiments, the first terminal device is caused to determine the packet data unit session by: in response to the first terminal device being in a connected state, determining whether a packet data unit session served by the core network is available for the communication via the routed connection; and in response to determining that no packet data unit session served by the core network is available, initiating setup of a packet data unit session for the communication via the routed connection.

In some example embodiments, the first terminal device is further caused to determine the packet data unit session by: in response to determining that the packet data unit session is available, determining whether a quality of service flow of the packet data unit session is available for the communication via the routed connection; and in response to determining that no quality of service flow is available, adding a quality of service flow for the communication into the packet data unit session, or adjusting a quality of service flow of the packet data unit session for the communication.

In some example embodiments, the request comprises a request for establishing or resuming a radio resource control connection, and the first terminal device is caused to send the request to the first network device by: in response to the first terminal device being in an idle or inactive state, sending the request for establishing or resuming the radio resource control connection, the request containing the cause for the determined proactive switching.

In some aspects, a second terminal device, comprising: at least one processor; and at least one memory including computer program code; the at least one memory and the computer program code configured to, with the at least one processor, cause the second terminal device to: determine that a device-to-device connection for communication with at least a first terminal device is to be switched to a connection routed by at least one network device; send, to the at least one first terminal device, an indication of a decision to switch from the device-to-device connection to the routed connection; and perform switching from the device to device connection to the routed connection.

In some example embodiments, the second terminal device is further caused to: receive, from the first terminal device via the device-to-device connection, an acknowledgement for the switching.

In some example embodiments, the second terminal device is caused to determine that the device-to-device connection is to be switched to the routed connection in response to: receiving a number of scheduling request rejections for the communication via the device-to-device connection, the number of scheduling request rejections being above a threshold number, receiving a scheduling request rejection for the communication via the device-to-device connection, the scheduling request rejection indicating that the device-to-device connection is to be switched to the routed connection, determining that a traffic load via the device-to-device connection is above a threshold load, receiving, from an upper layer above an access stratum layer, an indication that the device-to-device connection is to be switched to the routed connection, or receiving, from the access stratum layer, an indication that a specific device-to-device transmission mode is unavailable.

In some example embodiments, the indication is sent in a message either on an upper layer above an access stratum layer or on access stratum layer.

In some example embodiments, the second terminal device is caused to send the indication by: sending a request for the switching to a second network device of the at least one network device; receiving a response for the request from the second network device; and in response the response indicating that the switching is allowed, sending the indication to the first terminal device via the device-to-device connection.

In some example embodiments, the second terminal device is caused to perform the switching by: determining whether a packet data unit session served by a core network is required for the communication via the routed connection; and in response to determining that the packet data unit session is required, determining the packet data unit session.

In some example embodiments, the second terminal device is caused to determine whether the packet data unit session is required by: receiving, from a second network device of the at least one network device, an indication that the packet data unit session is required; and determining that the packet data unit session is required.

In some example embodiments, the second terminal device is caused to determine the packet data unit session by: in response to the second terminal device being in a connected state, determining whether a packet data unit session served by the core network is available for the communication via the routed connection; and in response to determining that no packet data unit session served by the core network is available, initiating setup of a packet data unit session for the communication via the routed connection.

In some example embodiments, the second terminal device is further caused to determine the packet data unit session by: in response to determining that the packet data unit session is available, determining whether a quality of service flow of the packet data unit session is available for the communication via the routed connection; and in response to determining that no quality of service flow is available, adding a quality of service flow for the communication into the packet data unit session, or adjusting a quality of service flow of the packet data unit session for the communication.

In some example embodiments, the second terminal device is further caused to determine the packet data unit session by: in response to the second terminal device being in an idle or inactive state, initiating setup of a radio resource control connection.

In some example embodiments, the indication indicates that the packet data unit session is required for the communication via the routed connection.

In some example embodiments, the indication contains context information of the routed connection associated with the second terminal device.

In some example embodiments, the context information contains at least one of a cell identifier and a public land mobile network identifier associated with the second terminal device.

In some aspects, a method comprises: receiving, by a first terminal device, from a second terminal device via a deviceto-device connection, an indication of a decision to switch the device-to-device connection to a connection routed by at least one network device for communication with the second terminal device; determining, based on the received indication from the second terminal device, proactive switching from the device-to-device connection to the routed connection to be performed; and sending a request to a first network device of the at least one network device to set up the routed connection, the request indicating a cause for the determined proactive switching.

In some example embodiments, the method further comprises: sending, to the second terminal device via the device-to-device connection, an acknowledgement for the switching.

In some example embodiments, the method further comprises: determining whether a packet data unit session served by a core network is required for the communication via the routed connection; and in response to determining that the packet data unit session is required, determining the packet data unit session.

In some example embodiments, determining whether the packet data unit session is required comprises: determining whether the indication indicates that the packet data unit session is required; and in response to the indication indicating that the packet data unit session is required, determining that the packet data unit session is required.

In some example embodiments, determining whether the packet data unit session is required comprises: receiving, from a first network device of the at least one network device, an indication that the packet data unit session is required; and determining that the packet data unit session is required.

In some example embodiments, the indication contains context information of the routed connection associated with the second terminal device.

In some example embodiments, the context information contains at least one of a cell identifier and a public land mobile network identifier associated with the second terminal device, and determining whether the packet data unit session is required further comprises: determining, with the cell identifier or the public land mobile network identifier, whether the first terminal device is served by the same cell or the same public land mobile network as the second terminal device; and in response to determining that the first terminal device is served by the same cell or the same public land mobile network as the second terminal device, sending an indication for the switching to a first network device of the at least one network device, the indication containing the context information.

In some example embodiments, determining the packet data unit session comprises: in response to the first terminal device being in a connected state, determining whether a packet data unit session served by the core network is available for the communication via the routed connection; and in response to determining that no packet data unit session served by the core network is available, initiating setup of a packet data unit session for the communication via the routed connection.

In some example embodiments, determining the packet data unit session further comprises: in response to determining that the packet data unit session is available, determining whether a quality of service flow of the packet data unit session is available for the communication via the routed connection; and in response to determining that no quality of service flow is available, adding a quality of service flow for the communication into the packet data unit session, or adjusting a quality of service flow of the packet data unit session for the communication.

In some example embodiments, the request comprises a request for establishing or resuming a radio resource control connection, and sending the request to the first network device, and sending the request to the first network device comprises: in response to the first terminal device being in an idle or inactive state, sending the request for establishing or resuming the radio resource control connection, the request containing the cause for the determined proactive switching.

In some aspects, a method comprises: determining, by a second terminal device, that a device-to-device connection for communication with at least a first terminal device is to be switched to a connection routed by at least one network device; sending, to the at least one first terminal device, an indication of a decision to switch from the device-to-device connection to the routed connection; and performing switching from the device to device connection to the routed connection.

In some example embodiments, the method further comprises: receiving, from the first terminal device via the device-to-device connection, an acknowledgement for the switching.

In some example embodiments, the determining comprises determining that the device-to-device connection is to be switched to the routed connection in response to: receiving a number of scheduling request rejections for the communication via the device-to-device connection, the number of scheduling request rejections being above a threshold number, receiving a scheduling request rejection for the communication via the device-to-device connection, the scheduling request rejection indicating the switching, determining that a traffic load via the device-to-device connection is above a threshold load, receiving, from an upper layer above an access stratum layer, an indication that the device-to-device connection is to be switched to the routed connection, or receiving, from the access stratum layer, an indication that a specific device-to-device transmission mode is unavailable.

In some example embodiments, the indication is sent in a message either on an upper layer above an access stratum layer or on access stratum layer.

In some example embodiments, sending the indication comprises: sending a request for the switching to a second network device of the at least one network device; receiving a response for the request from the second network device; and in response the response indicating that the switching is allowed, sending the indication to the first terminal device via the device-to-device connection.

In some example embodiments, performing the switching comprises: determining whether a packet data unit session served by a core network is required for the communication via the routed connection; and in response to determining that the packet data unit session is required, determining the packet data unit session.

In some example embodiments, determining whether the packet data unit session is required comprises: receiving, from a second network device of the at least one network device, an indication that the packet data unit session is required; and determining that the packet data unit session is required.

In some example embodiments, determining the packet data unit session comprises: in response to the second terminal device being in a connected state, determining whether a packet data unit session served by the core network is available for the communication via the routed connection; and in response to determining that no packet data unit session served by the core network is available, initiating setup of a packet data unit session for the communication via the routed connection.

In some example embodiments, determining the packet data unit session further comprises: in response to determining that the packet data unit session is available, determining whether a quality of service flow of the packet data unit session is available for the communication via the routed connection; and in response to determining that no quality of service flow is available, adding a quality of service flow for the communication into the packet data unit session, or adjusting a quality of service flow of the packet data unit session for the communication.

In some example embodiments, determining the packet data unit session further comprises: in response to the second terminal device being in an idle or inactive state, initiating setup of a radio resource control connection.

In some example embodiments, the indication indicates that the packet data unit session is required for the communication via the routed connection.

In some example embodiments, the indication contains context information of the routed connection associated with the second terminal device.

In some example embodiments, the context information contains at least one of a cell identifier and a public land mobile network identifier associated with the second terminal device.

In some aspects, an apparatus comprises: means for receiving, by a first terminal device, from a second terminal device via a device-to-device connection, an indication of a decision to switch the device-to-device connection to a connection routed by at least one network device for communication with the second terminal device; means for determining, based on the received indication from the second terminal device, proactive switching from the device-to-device connection to the routed connection to be performed; and means for sending a request to a first network device of the at least one network device to set up the routed connection, the request indicating a cause for the determined proactive switching.

In some example embodiments, the apparatus further comprises: means for sending, to the second terminal device via the device-to-device connection, an acknowledgement for the switching.

In some example embodiments, the apparatus further comprises: means for determining whether a packet data unit session served by a core network is required for the communication via the routed connection; and means for in response to determining that the packet data unit session is required, determining the packet data unit session.

In some example embodiments, the means for determining whether the packet data unit session is required comprises: means for determining whether the indication indicates that the packet data unit session is required; and means for in response to the indication indicating that the packet data unit session is required, determining that the packet data unit session is required.

In some example embodiments, the means for determining whether the packet data unit session is required comprises: means for receiving, from a first network device of the at least one network device, an indication that the packet data unit session is required; and means for determining that the packet data unit session is required.

In some example embodiments, the indication contains context information of the routed connection associated with the second terminal device.

In some example embodiments, the context information contains at least one of a cell identifier and a public land mobile network identifier associated with the second terminal device, and the means for determining whether the packet data unit session is required further comprises: means for determining, with the cell identifier or the public land mobile network identifier, whether the first terminal device is served by the same cell or the same public land mobile network as the second terminal device; and means for in response to determining that the first terminal device is served by the same cell or the same public land mobile network as the second terminal device, sending an indication for the switching to a first network device of the at least one network device, the indication containing the context information.

In some example embodiments, the means for determining the packet data unit session comprises: means for in response to the first terminal device being in a connected state, determining whether a packet data unit session served by the core network is available for the communication via the routed connection; and means for in response to determining that no packet data unit session served by the core network is available, initiating setup of a packet data unit session for the communication via the routed connection.

In some example embodiments, the means for determining the packet data unit session further comprises: means for in response to determining that the packet data unit session is available, determining whether a quality of service flow of the packet data unit session is available for the communication via the routed connection; and means for in response to determining that no quality of service flow is available, adding a quality of service flow for the communication into the packet data unit session, or adjusting a quality of service flow of the packet data unit session for the communication.

In some example embodiments, the request comprises a request for establishing or resuming a radio resource control connection, and sending the request to the first network device, and the means for sending the request to the first network device comprises: means for in response to the first terminal device being in an idle or inactive state, sending the request for establishing or resuming the radio resource control connection, the request containing the cause for the determined proactive switching.

In some aspects, an apparatus comprises: means for determining, by a second terminal device, that a device-to-device connection for communication with at least a first terminal device is to be switched to a connection routed by at least one network device; means for sending, to the at least one first terminal device, an indication of a decision to switch from the device-to-device connection to the routed connection; and means for performing switching from the device to device connection to the routed connection.

In some example embodiments, the apparatus further comprises: means for receiving, from the first terminal device via the device-to-device connection, an acknowledgement for the switching.

In some example embodiments, the means for determining comprises means for determining that the device-to-device connection is to be switched to the routed connection in response to: receiving a number of scheduling request rejections for the communication via the device-to-device connection, the number of scheduling request rejections being above a threshold number, receiving a scheduling request rejection for the communication via the device-to-device connection, the scheduling request rejection indicating the switching, determining that a traffic load via the device-to-device connection is above a threshold load, receiving, from an upper layer above an access stratum layer, an indication that the device-to-device connection is to be switched to the routed connection, or receiving, from the access stratum layer, an indication that a specific device-to-device transmission mode is unavailable.

In some example embodiments, the indication is sent in a message either on an upper layer above an access stratum layer or on access stratum layer.

In some example embodiments, the means for sending the indication comprises: means for sending a request for the switching to a second network device of the at least one network device; means for receiving a response for the request from the second network device; and means for in response the response indicating that the switching is allowed, sending the indication to the first terminal device via the device-to-device connection.

In some example embodiments, the means for performing the switching comprises: means for determining whether a packet data unit session served by a core network is required for the communication via the routed connection; and means for in response to determining that the packet data unit session is required, determining the packet data unit session.

In some example embodiments, the means for determining whether the packet data unit session is required comprises: means for receiving, from a second network device of the at least one network device, an indication that the packet data unit session is required; and means for determining that the packet data unit session is required.

In some example embodiments, the means for determining the packet data unit session comprises: means for in response to the second terminal device being in a connected state, determining whether a packet data unit session served by the core network is available for the communication via the routed connection; and means for in response to determining that no packet data unit session served by the core network is available, initiating setup of a packet data unit session for the communication via the routed connection.

In some example embodiments, the means for determining the packet data unit session further comprises: means for in response to determining that the packet data unit session is available, determining whether a quality of service flow of the packet data unit session is available for the communication via the routed connection; and means for in response to determining that no quality of service flow is available, adding a quality of service flow for the communication into the packet data unit session, or adjusting a quality of service flow of the packet data unit session for the communication.

In some example embodiments, the means for determining the packet data unit session further comprises: means for in response to the second terminal device being in an idle or inactive state, initiating setup of a radio resource control connection.

In some example embodiments, the indication indicates that the packet data unit session is required for the communication via the routed connection.

In some example embodiments, the indication contains context information of the routed connection associated with the second terminal device.

In some example embodiments, the context information contains at least one of a cell identifier and a public land mobile network identifier associated with the second terminal device.

In some aspects, a computer readable storage medium comprises program instructions stored thereon, the instructions, when executed by a processor of a device, causing the device to perform the method according to some example embodiments of the present disclosure.

What is claimed is:

1. A first terminal device, comprising:
at least one processor; and
at least one memory including computer program code;
the at least one memory and the computer program code configured to, with the at least one processor, cause the first terminal device to:
receive, from a second terminal device via a device-to-device connection, an indication of a decision to switch the device-to-device connection to a connection routed by at least one network device for communication with the second terminal device;
determine, based on the received indication from the second terminal device, proactive switching from the device-to-device connection to the routed connection to be performed; and
send a request to a first network device of the at least one network device to set up the routed connection, the request indicating a cause for the determined proactive switching,
wherein the first terminal device is further caused to:
determine whether a packet data unit session served by a core network is required for the communication via the routed connection; and
in response to determining that the packet data unit session is required, determine the packet data unit session,
wherein the determining and setup of the packet data unit session is performed after the indication is received and a connection setup is initiated for both the first terminal device and the second terminal device in parallel.

2. The first terminal device of claim 1, wherein the first terminal device is further caused to:
send, to the second terminal device via the device-to-device connection, an acknowledgement for the switching.

3. The first terminal device of claim 1, wherein the first terminal device is caused to determine whether the packet data unit session is required by:
determining whether the indication indicates that the packet data unit session is required; and
in response to the indication indicating that the packet data unit session is required, determining that the packet data unit session is required.

4. The first terminal device of claim 1, wherein the first terminal device is caused to determine whether the packet data unit session is required by:
receiving, from a first network device of the at least one network device, an indication that the packet data unit session is required; and
determining that the packet data unit session is required.

5. The first terminal device of claim 1, wherein the indication contains context information of the routed connection associated with the second terminal device.

6. The first terminal device of claim 5, wherein the context information contains at least one of a cell identifier and a public land mobile network identifier associated with the second terminal device, and the first terminal device is further caused to determine whether the packet data unit session is required by:
determining, with the cell identifier or the public land mobile network identifier, whether the first terminal device is served by the same cell or the same public land mobile network as the second terminal device; and
in response to determining that the first terminal device is served by the same cell or the same public land mobile network as the second terminal device, sending an indication for the switching to a first network device of the at least one network device, the indication containing the context information.

7. The first terminal device of claim 1, wherein the first terminal device is caused to determine the packet data unit session by:
in response to the first terminal device being in a connected state, determining whether a packet data unit session served by the core network is available for the communication via the routed connection; and
in response to determining that no packet data unit session served by the core network is available, initiating setup of a packet data unit session for the communication via the routed connection.

8. The first terminal device of claim 7, wherein the first terminal device is further caused to determine the packet data unit session by:
in response to determining that the packet data unit session is available, determining whether a quality of service flow of the packet data unit session is available for the communication via the routed connection; and
in response to determining that no quality of service flow is available,
adding a quality of service flow for the communication into the packet data unit session, or
adjusting a quality of service flow of the packet data unit session for the communication.

9. The first terminal device of claim 1, wherein the request comprises a request for establishing or resuming a radio resource control connection, and the first terminal device is caused to send the request to the first network device by:
in response to the first terminal device being in an idle or inactive state, sending the request for establishing or resuming a radio resource control connection, the request containing the cause for the determined proactive switching.

10. A second terminal device, comprising:
at least one processor; and
at least one memory including computer program code;
the at least one memory and the computer program code configured to, with the at least one processor, cause the second terminal device to:
determine that a device-to-device connection for communication with at least a first terminal device is to be switched to a connection routed by at least one network device,
wherein the second terminal device is caused to determine that the device-to-device connection is to be switched to the routed connection in response to receiving a number of scheduling request rejections for the communication via the device-to-device connection, the number of scheduling request rejections being above a threshold number;
send, to the first terminal device, an indication of a decision to switch from the device-to-device connection to the routed connection; and
perform switching from the device-to-device connection to the routed connection.

11. The second terminal device of claim 10, wherein the second terminal device is further caused to receive, from the first terminal device via the device-to-device connection, an acknowledgement for the switching; and
wherein:
the first and second terminal devices each comprise user equipment (UE) capable of wireless communications with each other and with a base station;
the device-to-device connection comprises a wireless sidelink connection directly from the first terminal device to the second terminal device;
the at least one network device comprises the base station; and
the routed connection comprises at least a Uu connection between one of the first and second terminal devices and the base station.

12. The second terminal device of claim 10, wherein the second terminal device is caused to determine that the device-to-device connection is to be switched to the routed connection in response to:
receiving a scheduling request rejection for the communication via the device-to-device connection, the scheduling request rejection indicating that the device-to-device connection is to be switched to the routed connection,
determining that a traffic load via the device-to-device connection is above a threshold load,
receiving, from an upper layer above an access stratum layer, an indication that the device-to-device connection is to be switched to the routed connection, or
receiving, from the access stratum layer, an indication that a specific device-to-device transmission mode is unavailable.

13. The second terminal device of claim 10, wherein the indication is sent in a message either on an upper layer above an access stratum layer or on access stratum layer.

14. The second terminal device of claim 10, wherein the second terminal device is caused to send the indication by:
sending a request for the switching to a second network device of the at least one network device;
receiving a response for the request from the second network device; and
in response the response indicating that the switching is allowed, sending the indication to the first terminal device via the device-to-device connection.

15. The second terminal device of claim 10, wherein the second terminal device is caused to perform the switching by:
determining whether a packet data unit session served by a core network is required for the communication via the routed connection; and
in response to determining that the packet data unit session is required, determining the packet data unit session.

16. The second terminal device of claim 15, wherein the second terminal device is caused to determine whether the packet data unit session is required by:
receiving, from a second network device of the at least one network device, an indication that the packet data unit session is required; and
determining that the packet data unit session is required.

17. The second terminal device of claim 15, wherein the second terminal device is caused to determine the packet data unit session by:
in response to the second terminal device being in a connected state, determining whether a packet data unit session served by the core network is available for the communication via the routed connection; and
in response to determining that no packet data unit session served by the core network is available, initiating setup of a packet data unit session for the communication via the routed connection.

18. The second terminal device of claim 17, wherein the second terminal device is further caused to determine the packet data unit session by:
- in response to determining that the packet data unit session is available, determining whether a quality of service flow of the packet data unit session is available for the communication via the routed connection; and
- in response to determining that no quality of service flow is available, adding a quality of service flow for the communication into the packet data unit session, or adjusting a quality of service flow of the packet data unit session for the communication.

19. The second terminal device of claim 17, wherein the second terminal device is further caused to determine the packet data unit session by:
- in response to the second terminal device being in an idle or inactive state, initiating setup of a radio resource control connection.

20. The first terminal device of claim 1, wherein:
- the first and second terminal devices each comprise user equipment (UE) capable of wireless communications with each other and with a base station;
- the device-to-device connection comprises a wireless sidelink connection directly from the first terminal device to the second terminal device;
- the at least one network device comprises the base station; and
- the routed connection comprises at least a Uu connection between one of the first and second terminal devices and the base station.

* * * * *